United States Patent [19]

Bergman

[11] 4,444,534
[45] Apr. 24, 1984

[54] VERTICAL AND HORIZONTAL MACHINE TOOLS

[76] Inventor: Raymond A. Bergman, 107 E. Second St., Minster, Ohio 45865

[21] Appl. No.: 257,989

[22] Filed: Apr. 27, 1981

[51] Int. Cl.³ .......................... B23C 1/06; B23C 1/14
[52] U.S. Cl. ................... 409/164; 308/3 A; 308/6 C; 408/235; 409/189; 409/198; 409/221; 409/235; 409/237
[58] Field of Search ............... 29/26 A, 568; 409/235, 409/164, 237, 174, 238, 189, 239, 241, 198, 231, 221, 185, 206, 209, 212, 210, 207, 208; 308/3 A, 6 C, 5 R; 269/20; 82/32; 408/234, 235, 237

[56] References Cited

U.S. PATENT DOCUMENTS

| | | | |
|---|---|---|---|
| 2,440,919 | 5/1948 | Shaw | 308/3 |
| 2,484,885 | 10/1949 | Hassman et al. | 409/206 |
| 2,885,915 | 5/1959 | Schurger | 77/64 |
| 2,899,869 | 8/1959 | Daugherty | 90/16 |
| 2,947,224 | 8/1960 | Woytych | 90/11 |
| 3,042,460 | 7/1962 | Gilbert, Sr. et al. | 308/9 |
| 3,097,568 | 7/1963 | Kampmeier | 409/239 |
| 3,108,791 | 10/1963 | Budney et al. | 269/20 |
| 3,155,383 | 11/1964 | Whitmore | 269/58 |
| 3,272,569 | 9/1966 | Mergen | 308/6 C X |
| 3,384,425 | 5/1968 | Brown | 308/5 |
| 3,389,625 | 6/1968 | Wagner | 308/3 A X |
| 3,455,207 | 7/1969 | Meinke | 409/239 |
| 3,619,013 | 11/1971 | Jones | 308/5 |
| 3,658,393 | 4/1972 | Luthi | 308/5 |
| 3,693,965 | 9/1972 | Mitsengendler | 269/20 |
| 3,703,847 | 11/1972 | Pillot et al. | 409/235 X |
| 3,772,961 | 11/1973 | Siebert | 90/58 B |
| 3,788,632 | 1/1974 | Lukas | 269/20 |
| 3,871,721 | 3/1975 | Siebert | 308/5 |
| 3,903,993 | 9/1975 | Vorrhees et al. | 184/5 |
| 4,058,885 | 11/1977 | Bergman | 269/20 X |
| 4,076,339 | 2/1978 | Schrolucke | 308/9 |
| 4,080,009 | 3/1978 | Marathe et al. | 308/3.5 |
| 4,114,959 | 9/1978 | Christ | 308/3.5 |
| 4,118,844 | 10/1978 | Matsuzaki et al. | |
| 4,179,106 | 12/1979 | Bergman | 269/20 |

FOREIGN PATENT DOCUMENTS 601117  4/1978  U.S.S.R. ............... 308/3 A

*Primary Examiner*—Z. R. Bilinsky
*Attorney, Agent, or Firm*—Jeffers, Irish & Hoffman

[57] ABSTRACT

A machine tool apparatus having a bifurcated column structure comprising spaced apart columns which enclose and slidably secure the mounting end of an arm, the opposite end of which receives a rotating spindle adapted to engage and rotate a variety of machining tools. The bifurcated column structure has three primary ways having their guiding surfaces arranged generally in one plane, and the third having its guiding surface in a plane orthogonally related to the plane of the first ways. The column structure also includes three secondary ways positioned in opposed relation to the respective primary ways. Antifriction bearings are connected to the mounting end of the arm in opposed relation to the three primary and three secondary ways and serve to guide the arm for vertical movement within the column structure. Two sets of bearings are provided, one set being disposed generally in a first horizontal plane near the upper end of the arm, and the other set disposed in a horizontal plane near the lower end of the arm so that structural rigidity for the arm against movement about a horizontal axis is achieved. The bearings facing the secondary gibs are connected to a preloading piston and cylinder arrangement which forces the bearings attached thereto against their respective secondary ways, thereby urging the arm against the three primary ways.

25 Claims, 18 Drawing Figures

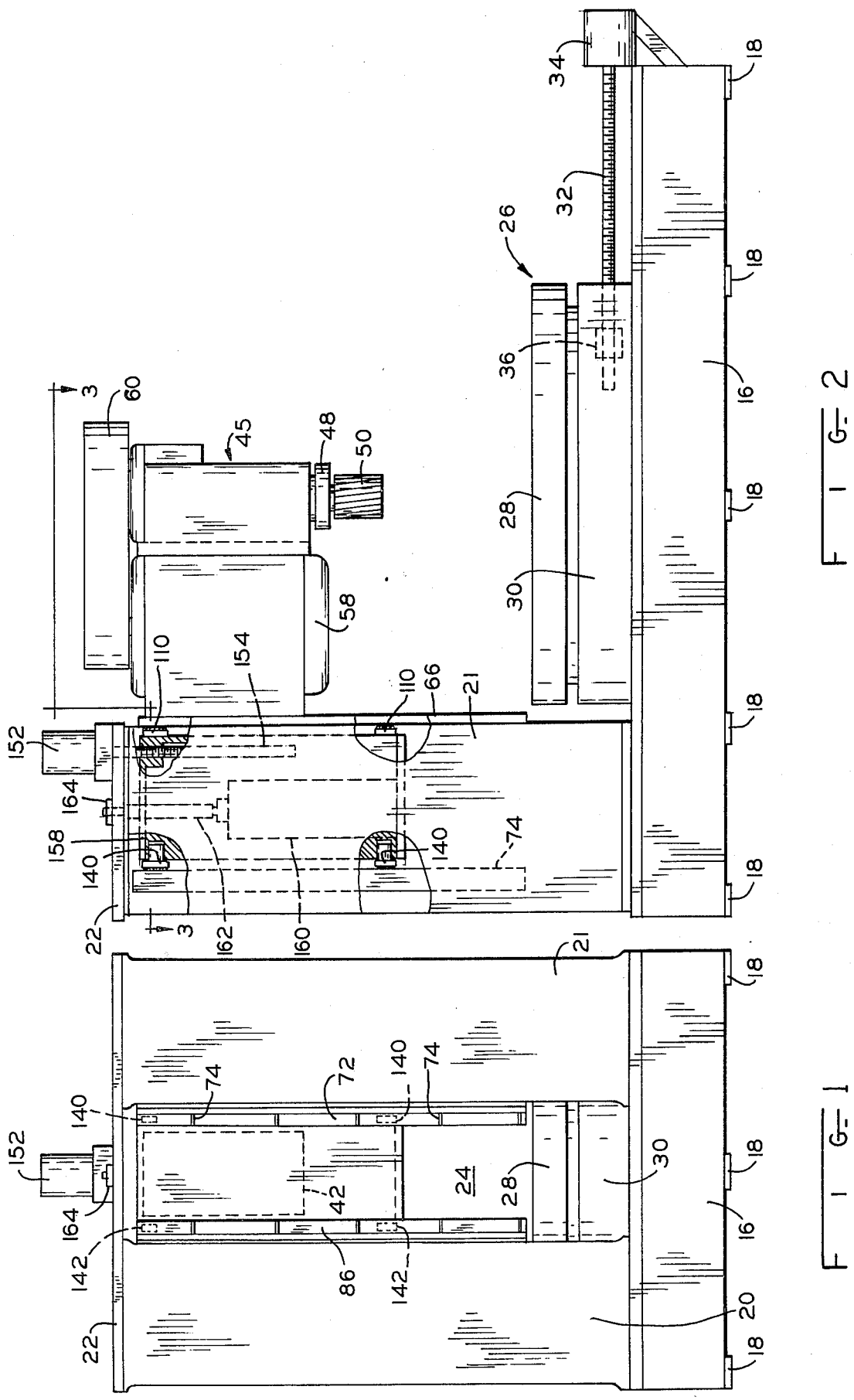

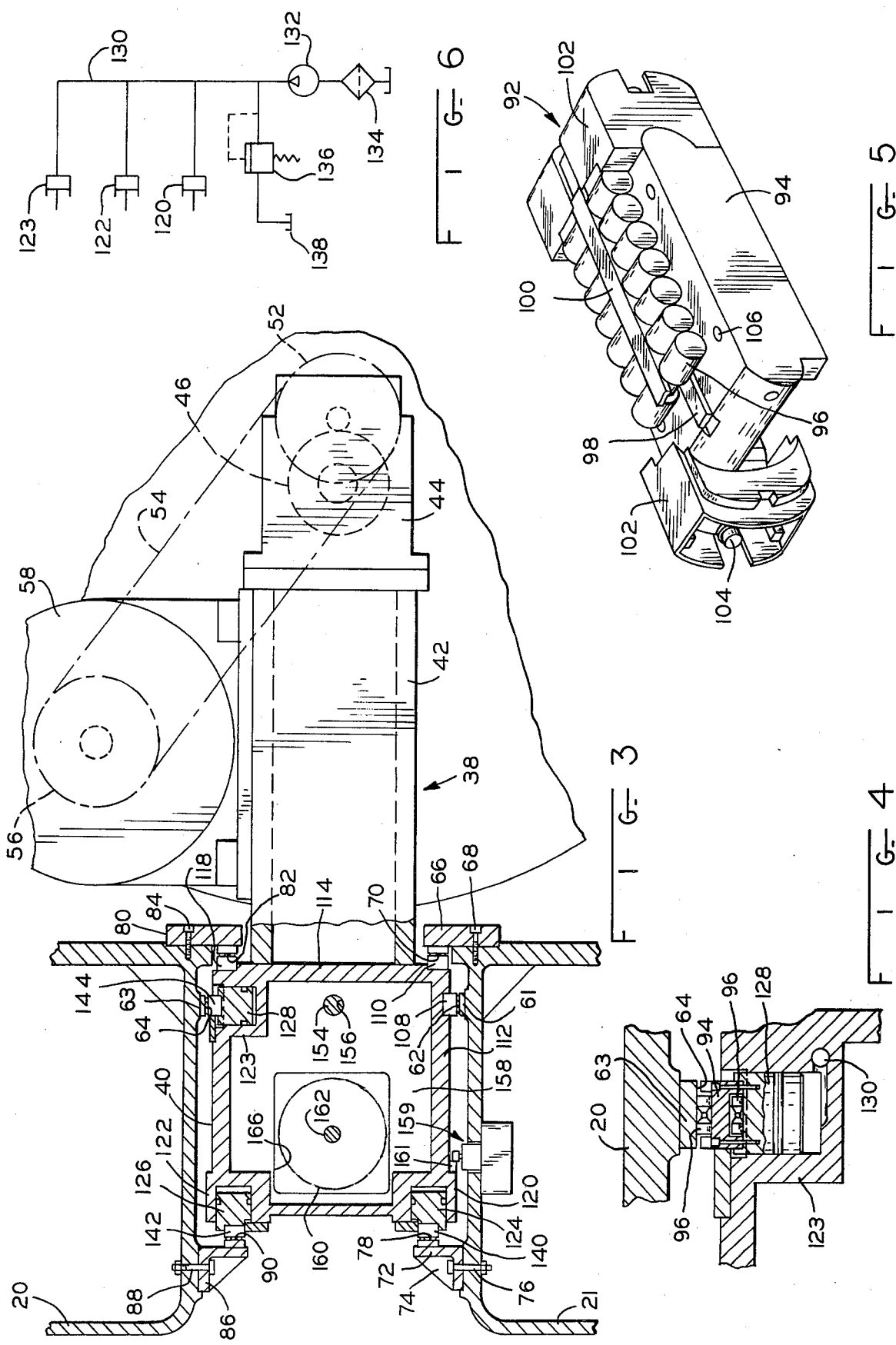

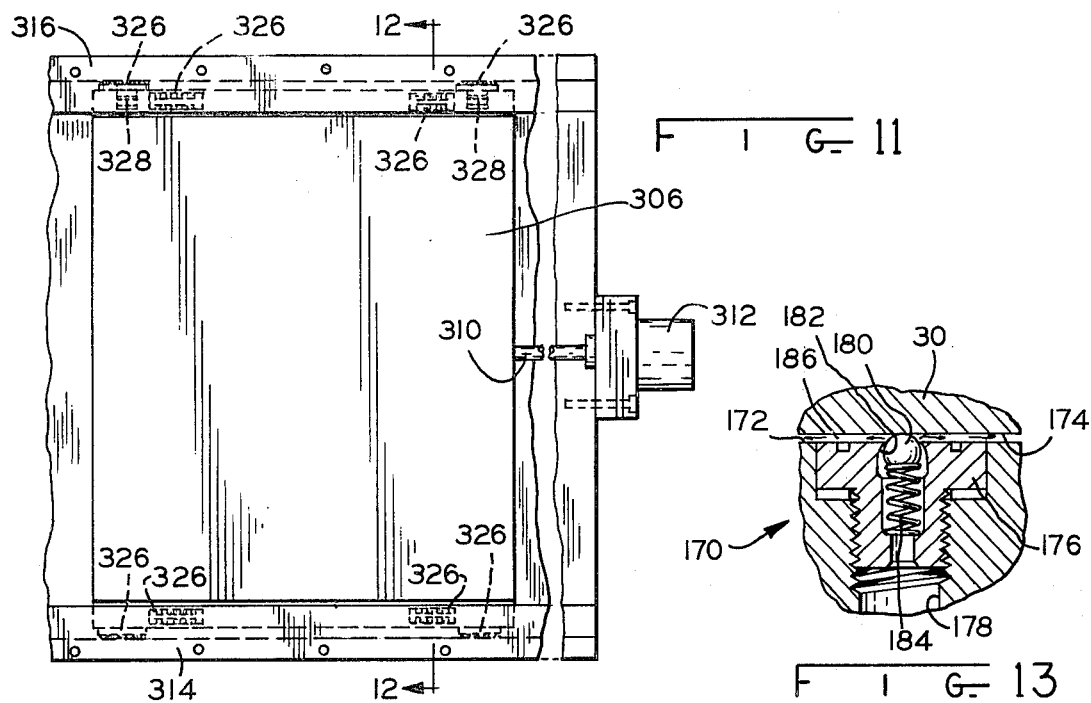
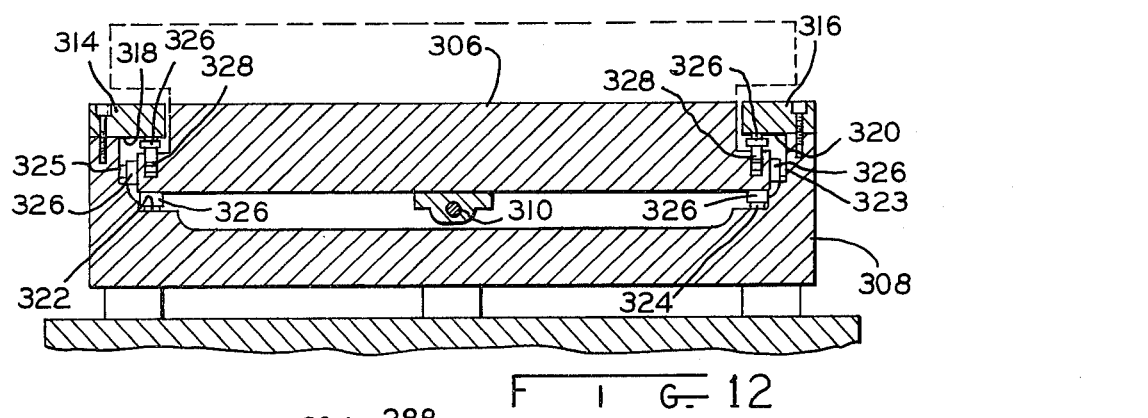
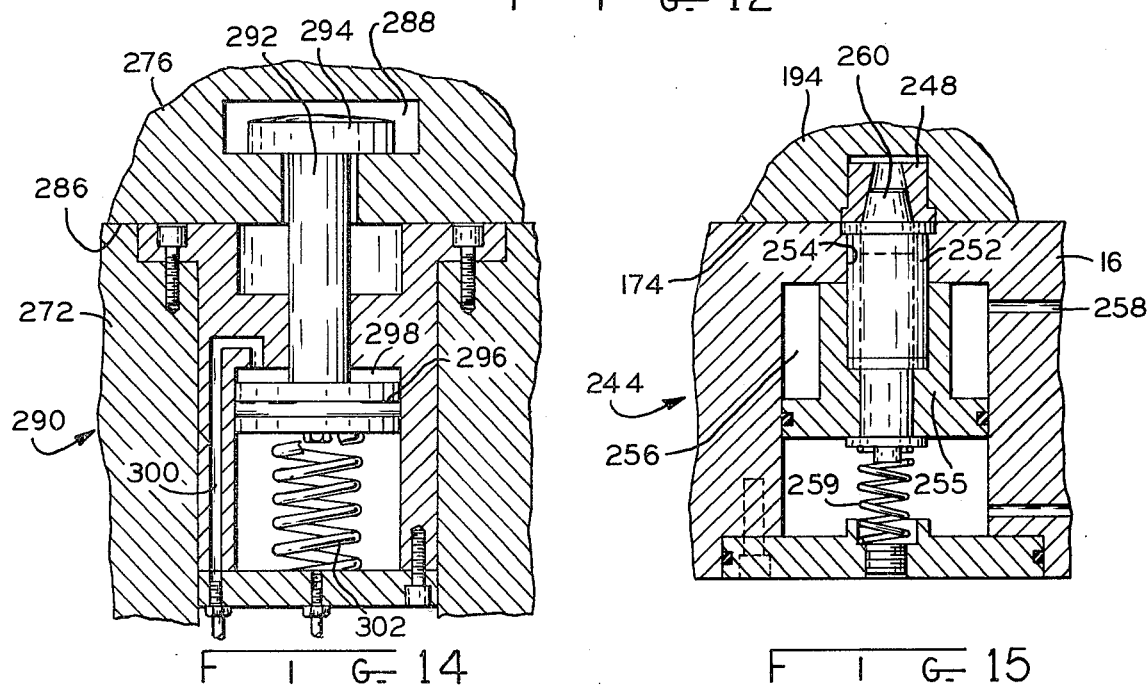

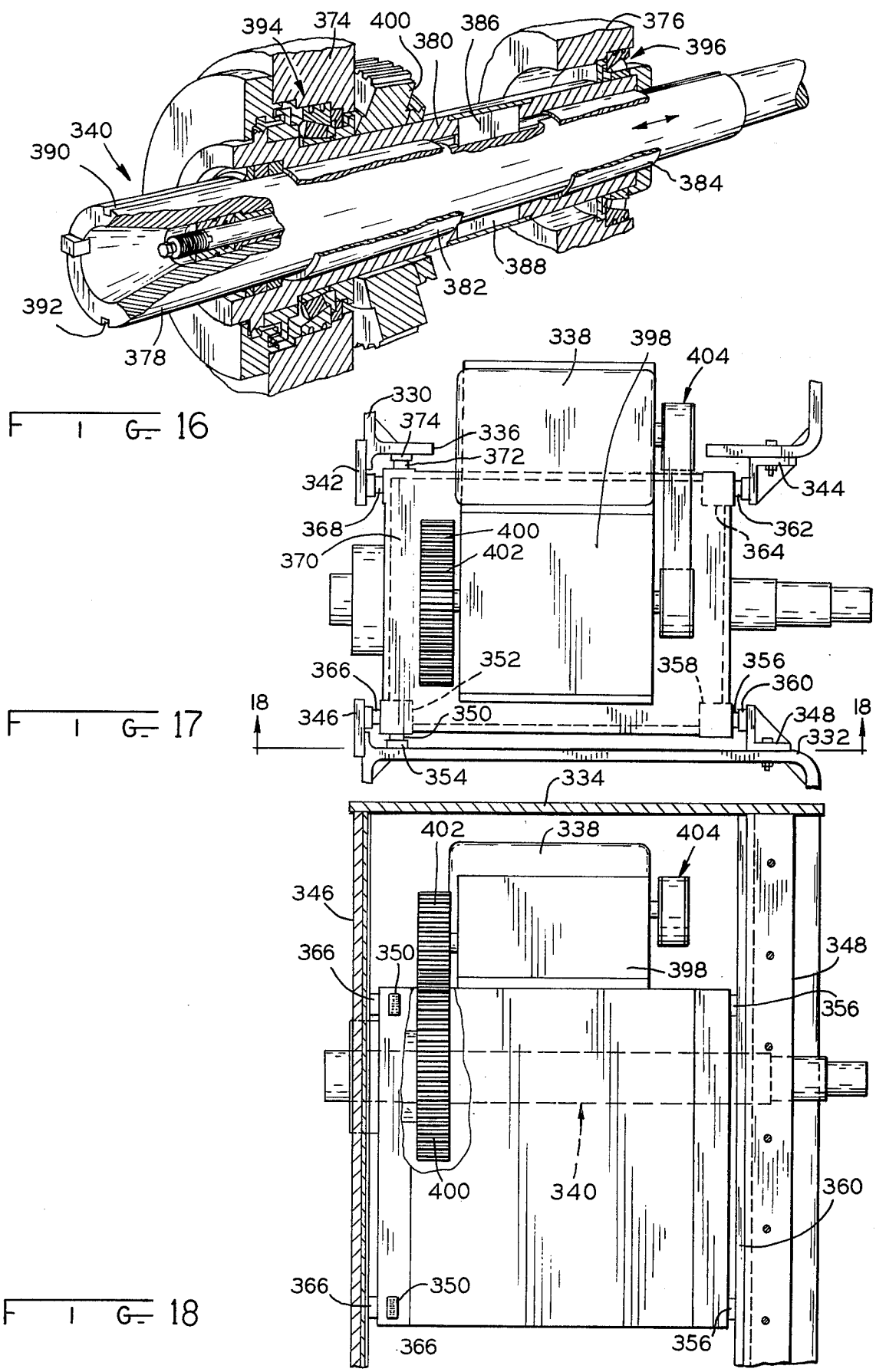

VERTICAL AND HORIZONTAL MACHINE TOOLS

BACKGROUND OF THE INVENTION

The present invention relates to a machine tool for engaging and selectively rotating a tool element and for supporting a workpiece in a very accurately predetermined position relative to the tool for machining. The machine tool may move either or both the tool element and workpiece during machining to accomplish a variety of machining operations, such as facing, milling, boring, turning, drilling and reaming.

Machine tools are known wherein the supporting structure for the spindle comprises a vertical column having vertical rails or ways wherein the spindle head is mounted within the ways and guided for vertical movement. The base of the machine supports a carriage or slide on longitudinal waves for rectilinear movement toward and away from the column, and a rotary index table is supported on the carriage for rotary movement about a vertical axis. Depending on the complexity of the machine, the spindle head assembly can include ways for permitting lateral sliding of the spindle in a horizontal direction relative to the column assembly.

In a vertical turning lathe, the tool is held in the spindle against movement, and the table, which has the workpiece clamped thereto, rotates relative to the tool, which is moved into the workpiece to perform a turning operation. The spindle can also be driven, in which case a rotary machining tool is utilized in order to effect facing, milling, drilling, tapping and reaming operations. In some operations, such as milling, the work is rotated by the table into the rotating tool.

The spindle can be oriented either vertically, as in the case of vertical turning lathe, or horizontally, in which case the tool is rotated about a horizontal axis. In either case, it is necessary that the spindle be raised and lowered relative to the work supporting table.

The spindle heads in machine tools of this type have traditionally been mounted in an external cantilevered relation on the side of the column structure. This arrangement permits the spindle to reach sufficiently far beyond the column to enable reaching of the workpiece during machining, and the base of the spindle assembly in the vertical direction can be chosen sufficiently long to enable it to be captured between relatively long gibs. The long spindle base in the vertical direction is an attempt to provide sufficient rigidity to the spindle assembly to resist tilting about a horizontal axis during machining. Because the spindle assembly is cantilevered, very expensive adjustable gibbing is necessary to give it sufficient rigidity to withstand the side loads encountered during machining. Furthermore, the assembly or arm which supports the spindle is generally constructed of a plurality of parts, which contributes to a reduction in the overall rigidity, and therefore accuracy, of the machine.

One prior art method of very accurately guiding a machine tool arm for vertical movement is to provide precision gibs which are adjusted to define the guide-path for the arm within very close tolerances. An oil film interface between the gibs and arm permits sliding movement, but localized pressures caused by side loads on the spindle arm cause a variation in oil film thickness from gib to gib, thereby affecting close tolerance machining accuracy. Particularly where travel of the arm exceeds several feet, it is extremely difficult to accurately machine and adjust gibs in several axis locations within desired tolerance levels for this type of machining work. The cantilevering of the spindle mounting arm compounds the effect of the side loads, thereby even further affecting machine accuracy. Another factor is thermal growth, which changes the clearance between the gibs and arm.

Not only are the spindle head assemblies of many prior art machine tools of this type quite complex, but also are the mechanisms utilized to translate and rotate the carriage and rotary index table relative to the spindle. In many rotary tables, for example, very complicated bearing arrangements are necessary to ensure that the table can be rotated easily while it supports a heavy workpiece, yet remains substantially level both during and after movement. Additionally, complicated mechanisms are often utilized to accurately locate the table at a desired degree of rotation, and then index it to the subsequent position for the next machining operation. A similar problem exists for accurately moving and locating the carriage at a desired position in front of the spindle supporting column.

SUMMARY OF THE INVENTION

The machine tool according to the present invention overcomes the complexities of prior art machine tools of this type, but without sacrificing the rigidity between the spindle and supporting columns which is necessary to ensure close tolerance machining. By reducing the complexity, a machine results which can be manufactured at a substantially lower cost and wherein maintenance and set up time are reduced.

The machine tool in question avoids the traditional prior art approach of supporting the spindle head in a cantilevered fashion on one side of the supporting column structure. The column structure is bifurcated to provide a space between two columns and the spindle supporting arm is captured between the columns for very accurate vertical movement by means of three primary ways or gibs, three secondary ways in opposed relation to the primary ways, and a plurality of preloaded bearing pairs acting between the opposed primary and secondary ways. By capturing the mounting end of the spindle arm within the columns rather than within external gibs mounted to the face of the column structure, much more rigidity between the spindle arm and column structure can be realized.

The primary ways, which are preferably formed as planar bearing surfaces, are extremely flat in the vertical direction and lie within planes that are vertical within very close tolerances. The secondary gibs, which are located in opposed relation to the primary gibs, need not be machined and formed as accurately as the primary gibs because of the constant preload system forming a part of the invention. The preload system comprises expansible chamber devices, such as pistons and cylinders, connected to the spindle arm and urging their antifriction bearings against the secondary ways. This, in turn, urges the spindle arm and the bearings on the opposite side thereof against the primary ways. If a constant fluid pressure is exerted on the preload pistons, the bearings opposing the primary ways will always be preloaded to a constant degree, and even though the secondary ways may be non-parallel with the primary ways or have localized high or low spots, the arm will always be jammed into the orthogonally related primary ways with a constant deflection of the primary bearings. This ensures that the spindle arm moves vertically within the tolerances of the primary bearings and primary ways at all times.

Whereas in prior art machines of this type the spindle arm is generally an assembly of parts connected together and extending outwardly from the side of the column structure, the arm utilized in the present invention is of unitary construction, and may be formed from a single casting or a unitary weldment. Rigidity of a arm constructed in this manner is optimum, and because the arm is limited to movement only in the vertical direction, the customary mechanisms to provide lateral movement of the spindle are present. The spindle itself can be connected to the spindle arm in any manner suitable to achieve maximum rigidity, and may rotate either about a vertical or horizontal axis.

Specifically, the machine tool according to the present invention comprises a base, and a bifurcated column structure rigidly connected to the base and extending generally upwardly therefrom, the column structure having spaced apart sides. A spindle arm is mounted between the spaced apart sides of the column structure and includes a spindle end extending forwardly therefrom, the arm including an upper end and a lower end each received between and guided within the spaced apart sides of the column structure. A spindle is connected to the spindle end of the arm and is adapted for selectively engaging, disengaging and rotating a variety of tools, or holding the tools in a fixed position during machining, as in the case of a turning operation. Three vertical primary ways are provided on the column structure with one of the primary ways being orthogonally related to the other two primary ways. Three vertical secondary ways are also provided on the column structure in opposed relation respectively to the primary ways, wherein one of the secondary ways is orthogonally related to the other two secondary ways. By "orthogonally related" is meant that the plane or direction along which the two ways guide the arm is perpendicular to the plane along which the other ways guides the arm. Thus, in the case of planar guide surfaces, the planes of the first two ways are perpendicular to the plane of the orthogonally related way.

A plurality of first linear bearing means are connected respectively between the arm upper end and the ways for guiding the arm vertically on the ways; and a plurality of second linear bearings are connected respectively between the arm lower end the ways for similarly guiding the arm in the vertical direction. Preload means are connected to each of the first and second linear bearings associated with a secondary way such that, when the preload means are activated, they urge the arm in a direction normal to the respective opposite primary ways. Means are connected to the arm for moving the arm vertically within the column structure.

In order to translate and rotate the table relative to the spindle and to enable a workpiece to be easily moved, located and clamped on the rotary table surface, a three layer pressurized fluid support system is provided by the present invention. A carriage is supported on the machine tool base and guided for rectilinear movement along a direction perpendicular to the supporting column structure. Means are provided for supplying a cushion of pressurized fluid, such as air, between the lower surface of the carriage and the upper surface of the base, so that there is very little friction between the carriage and base. This arrangement permits a relatively inexpensive, light duty ball screw or hydraulic ram arrangement to be utilized to traverse the carriage. Once the table reaches the desired position, clamps within the carriage can lock it in place. Accurate location of the carriage can be accomplished by encoding the ball screw feed, utilizing a rack and pinion readout, or capturing the carriage in preset positions by means of locating pins and sockets of the type described in U.S. Pat. No. 4,179,106, which patent is expressly incorporated by reference.

The rotary index table is also supported on a cushion of pressurized fluid established between its lower surface and the upper surface of the carriage and driven by means of a conventional gearing arrangement. A rack and pinion readout may be utilized to very accurately determine the angular position of the table, and conventional microprocessor or numerical control systems can be employed to stop the rotation of the table at the desired positions. The pressurized fluid between the table and carriage can be air in the case of small tables, or hydraulic fluid in the case of very massive tables adapted for supporting heavy workpieces.

In an alternative embodiment, the rotary table is supported on a cushion of pressurized air and the index rotary positions selected by means of retractable locating pins mounted within the carriage and corresponding tapered sockets within the lower surface of the table. A plurality of T-clamps disposed within downwardly facing T-slots in the lower surface of the table serve to clamp the table in place once the desired indexed position has been reached. A similar clamping arrangement is disclosed in copending application Ser. No. 040,072 filed May 17, 1979, which application has been allowed and is incorporated herein by reference.

The index table is provided with a plurality of valved fluid openings extending to the upper surface thereof, and a source of pressurized air connected to the valved openings through a network of fluid passages within the table. The valves include actuators which protrude above the surface of the table, and when in this position, close off the passages so that no air flows therethrough. When the actuators are depressed by a workpiece or workpiece fixture, however, they open passages so as to provide a cushion of fixture or workpiece supporting air between the fixture or workpiece and table so that the workpiece can be easily moved from one position to another on the table. The workpiece or fixture is then accurately located by means of retractable locating pins and sockets and then clamped in place in a manner described in the aforementioned U.S. Pat. No. 4,179,106.

The carriage can be very accurately supported during movement toward and away from the spindle by preloaded linear bearings of the type described in copending patent application Ser. No. 183,019 filed Sept. 2, 1980. In this arrangement, two antifriction bearings are connected to the carriage on opposite sides thereof and roll against ways on the base. One of the bearings is preloaded by means of an expansible chamber device such as a piston and cylinder, and forces the carriage and the opposite bearing against a primary gib surface, which is machined very flat and true. Since the preloading of the firstmentioned bearing results in the same preloading of the bearing acting against the primary gib surface, the latter bearing is deflected to a known degree and the carriage will move prefectly horizontal within the tolerances of the primary gib surfaces and the deflection tolerances of the bearings. Such preloaded bearing pairs are positioned both on the horizontal and vertical sides of the carriage.

Specifically, the table arrangement is adapted for use in a machine tool having a base, a column structure mounted to the base, and a spindle head connected to the column structure for movement in the vertical direction. The rotating and translating table arrangement comprises a carriage supported on the base and includes a downwardly facing lower surface and an upwardly facing upper surface. Means are provided, either in the base or carriage, for forming a cushion of pressurized fluid between the base and a downwardly facing lower surface of the carriage to support the carriage for rectilinear movement relative to the base, the base including guide surfaces engaging the carriage. A rotary table is rotatably supported on the carriage upper surface and has a downwardly facing surface opposite the upper surface of the carriage and in an upwardly facing surface adapted to support a workpiece or a workpiece fixture. Means are provided in the carriage for forming a cushion of pressurized fluid between the table lower surface and the carriage upper surface to support the table on the carriage for rotation about a vertical axis fixed relative to the carriage. A plurality of valves in the table upper surface are in communication with a source of pressurized air in the table, and the valves include actuators protruding slightly above the upper surface of the table for closing off the passages leading to the source of pressurized air when in their raised positions protruding above the upper surface. The actuators open the valve passages when depressed by a workpiece or fixture and the workpiece or fixture can then be moved under virtually friction-free conditions to the desired position on the table where it is located and clamped for subsequent machining. Means are provided for rotating the table on the carriage and for translating the carriage relative to the base.

It is an object of the present invention to provide a machine tool havng a very simple arrangement for connecting the spindle arm to the supporting column structure yet without sacrificing the rigidity necessary for close tolerance machining.

It is a further object of the present invention to provide a machine tool having greater rigidity between the spindle arm and supporting columns than prior art machines of this type wherein the spindle head is supported in a cantilevered fashion on one side of the column structure.

These and other objects of the present invention will be apparent from the detailed description considered together with the appropriate drawing figures.

BRIEF DESCRIPTION OF THE DRAWINGS

FIG. 1 is a rear elevational view of a machine tool constructed in accordance with the present invention;

FIG. 2 is a side elevational view thereof;

FIG. 3 is a sectional view of FIG. 2 taken along line 3—3 and viewed in the direction of the arrows;

FIG. 4 is an enlarged sectional view of one of the preloaded bearings;

FIG. 5 is an enlarged perspective view of one of the antifriction bearings;

FIG. 6 is a schematic diagram of the hydraulic preload system;

FIG. 11 is a plan view of an alternative form of the carriage;

FIG. 12 is a sectional view taken along line 12—12 of FIG. 11 and viewed in the direction of the arrows;

FIG. 13 is an enlarged sectional view of one of the valves on the surface of the table of FIG. 7;

FIG. 14 is a sectional view taken along line 14—14 of FIG. 9 and viewed in the direction of the arrows;

FIG. 15 is a sectional view taken along line 15—15 of FIG. 7 and viewed in the direction of the arrows; and FIG. 16 is a sectional perspective view of a conventional horizontal spindle mounted in the machine tool of the present invention;

FIG. 17 is a fragmentary plan view of the embodiment of FIG. 16 when a portion thereof has been shown in section; and FIG. 18 is a sectional view aong line 18—18 of FIG. 17 viewed in the direction of the arrows.

DETAILED DESCRIPTION

Figure 7:
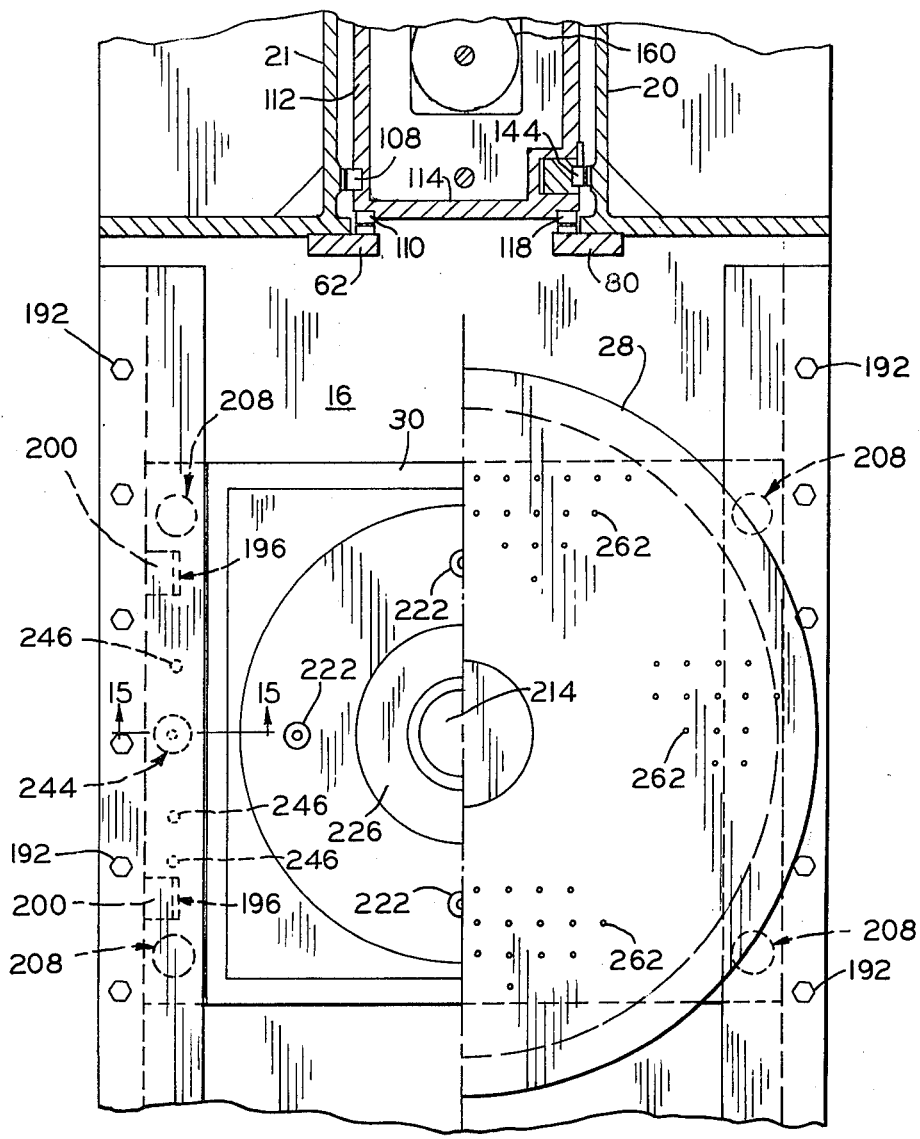
FIG. 7 is a plan view, partially in section, of a table and carriage arrangement according to one embodiment of the invention.

Referring now in detail to the drawings, and in particular to FIGS. 1, 2 and 3, the machine tool according to the present invention comprises a base 16 supported on levelers 18, a pair of vertical columns 20 and 21, and a top plate 22 connected to the upper ends of columns 20 and 21. Columns 20 and 21 are bolted or welded to base 16 and to top plate 22. Columns 20 and 21 are spaced apart in the horizontal direction as shown in FIG. 1 so that the column structure is bifurcated and defines an open space 24 therebetween. A table assembly 26 comprising rotary index table 28 rotatably supported on carriage 30 provides the support for workpieces (not shown) to be machined. Carriage 30 is slidable on base 16 and translated toward and away from columns 20 and 21 by means of a feed screw 32 rotated by a DC electric motor 34 and connected to carriage 30 through a conventional ball screw connection 36. Table assembly 16 may be constructed as a separate unit independent of the support base for columns 20 and 21.

A rigid, unitary spindle arm 38 made of a single casting or unitary weldment comprises a box-like mounting end portion 40 (FIG. 3), and a narrower and shorter extending portion 42 having a spindle mounting end 44 on the distal end thereof. Arm 38 is generally L-shaped as shown in FIG. 2 in that the mounting end 40 is longer in the vertical direction than is the extending spindle portion 42, 44.

A conventional spindle assembly is received within the spindle housing 44 and comprises drive gears 46, a chuck or collet portion 48 extending from housing 44 and having a suitable tool element 50 connected thereto, and a drive pulley 52. Pulley 52 is connected by a belt or timing chain 54 to another pulley 56, which is rotated by electric or hydraulic motor 58. A protective cover 60 encloses pulleys 52 and 56.

As shown in FIG. 3, column 21 is provided with a primary way or gib 61 having a bearing surface 62, which is a flat and extends nearly the full length of column 21. Surface 62 has been machined extremely flat and true and extends very accurately in the vertical direction. By "primary" way is meant that surface 62 is machined to very close tolerance specifications to have the properties just mentioned. Column 20 is provided with a secondary way 63, which is a gib having a surface 64 machined generally flat and parallel with primary way surface 62, although the machining tolerances need not be as precise as those of primary way 61. Secondary way 63 is directly opposite primary way 61.

A primary way 66, in the form of a detachable gib connected by a series of screws 68, has a gib surface 70 that is machined extremely flat, true and oriented precisely in the vertical direction. Opposite primary way 66 is another secondary way 72, having a plurality of generally triangular shaped web sections 74, and which is rigidly connected to column 21 by bolt 76. Way or gib 72 includes a bearing surface 78 machined generally flat and parallel to the primary way surface 70, although the machining tolerances need not be as precise as those for surface 70 for the reasons to be discussed below. Similarly, another primary way 80 having a very accurate bearing surface 82 is connected to column 20 by a plurality of screws 84. The corresponding secondary way 86 is connected by bolts 88 to column 20 and has its bearing surface 90 directly opposite surface 82, although not machined as accurately as surface 82. Ways 66, 61, 72, 86, 63 and 80 function to guide the mounting end 40 of arm 38 in the vertical direction between columns 21 and 22. It will be noted that the entire mounting portion 40 of arm 38 is captured between columns 21 and 22, which columns are extremely massive and rigid.

The very accurate guiding for arm 38 in the vertical direction is provided by a plurality of antifriction bearings 92 of the type illustrated in FIG. 5. Bearings 92, which are of conventional design, each comprises a race 94 on which a plurality of rollers 96 roll in recirculating fashion much like an endless track. Rollers 96 are guided by center guide 98 and stabilizer band 100; end caps 102, secured to race 94 by screws 104, serve to contain the rollers 96 as they make the transition from one flat surface of the race 94 to the other. Bearings 92 are connected to either the mounting end 40 of arm 38 or to the preload devices to be described below by screws extending through openings 106.

Two such bearings 108 and 110 are rigidly connected to the side 112 and front 114 of arm mounting end portion 40 and the rollers 96 thereof roll on way surfaces 62 and 70 of primary ways 61 and 66, respectively. In a similar fashion, bearing 118 is rigidly connected to the front side 114 of arm mounting end 40 and the rollers 96 thereof roll on way surface 82 of primary way 80.

Cylinders 120, 122 and 123 are formed in three corners of arm 38 as illustrated in FIG. 3 and pistons 124, 126 and 128 are slidably received therein. Suitable fluid passages 130 (FIG. 6) connect cylinders 120, 122 and 123 through a valve 132 to a suitable source of pressurized hydraulic fluid 134. A relief valve 136 connected to passage 130 and to sump 138 maintains the fluid pressure within passages 130, and therefore in cylinders 123, at a constant level.

Antifriction bearings 140, 142 and 144 of the type discussed above are rigidly connected to pistons 124, 126 and 128, respectively, and the rollers 96 thereof roll on way surfaces 78, 90 and 64, respectively. One of the preloaded bearings 144 is illustrated in greater detail in FIG. 4.

By maintaining the hydraulic pressure within cylinders 120, 122 and 123 constant, each of the bearing pairs is preloaded to a constant level. Since this results in a constant deflection of the bearings against the primary way surfaces 62, 70 and 82, and since these surfaces run flat, true and vertical with a high degree of accuracy, the mounting portion 40 of arm 38 captured within the ways will be guided very accurately. Even though the secondary way surfaces 78, 90 and 64 corresponding to the primary way surfaces 70, 82 and 62, may not be flat, parallel or exactly vertical, the movable pistons 124, 126 and 128 will extend or retract as necessary to ensure that the same preloading conditions occur. Thus, the arm is jammed against the primary way surfaces. The advantage to this arrangement is that only three very accurately machined and oriented way surfaces are necessary, as opposed to six if conventional adjustable gibs were employed to guide the spindle arm 38. Furthermore, the system is self-adjusting in that any changes in dimensions due to thermal growth, warping of the secondary gibs, etc. will be taken up by the preload cylinders.

As shown in FIGS. 1 and 2, two sets of the bearings 110, 108, 140, 142, 144 and 118 preloaded in the same manner as shown in FIG. 3 are connected to spindle arm 38. The bearings are connected very near the opposite ends of the mounting end 40 of arm 38 so that the support axis therefor is as long as possible. Ways 72, 86, 63, 80, 66 and 61 extend nearly the full height of columns 20 and 21 and enable the arm 38 to be traversed accordingly.

Arm 38 is raised and lowered by means of a hydraulic or electric motor 152, which rotates a threaded feed screw 154, which extends through a threaded opening 156 in the top plate 158 of spindle arm mounting end 40. A counterweight 160 is suspended by hanger rod 162 and nut 164 from the top plate 22 of column structure 20,21. Counterweight 160 extends through an opening 166 in the top plate 158. Thus, as arm 38 is raised and lowered by rotating feed screw 154, counterweight 160 remains stationary. A conventional rack and pinion encoder 159 and linear rack 161 can be utilized for reading out the vertical position of arm 38.

Although the column structure is disclosed as having two columns 20 and 21, it could be constructed of four separate columns welded or bolted to base 16 and held together at their upper ends by a top plate 22. What is important is that the direct support for the spindle arm 38 is provided by the two massive supporting columns 20 and 21, rather than by gibs attached to the front or sides of the column structure, as is the case with prior art machines.

Figure 8:
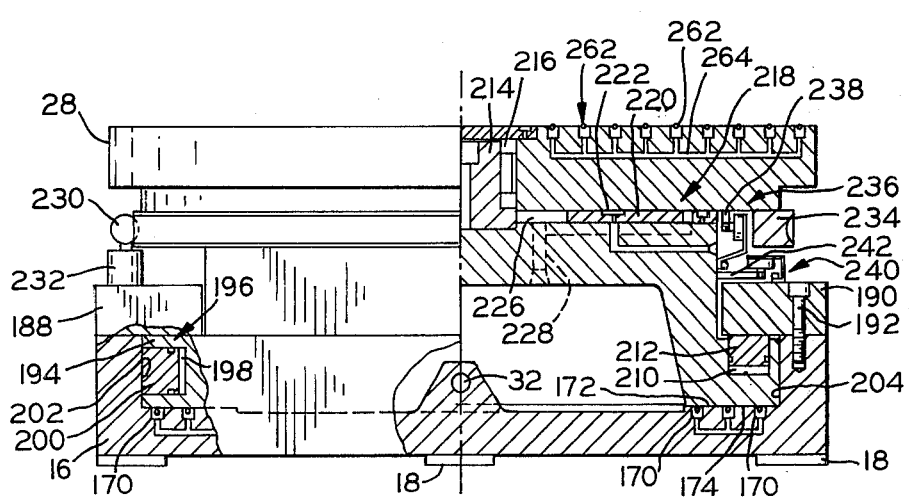
FIG. 8 is an elevational view of the table of FIG. 7 with portions thereof shown in section.

Referring now to FIGS. 7 and 8, the translating and rotating table assembly will be described. Base 16 is provided with a plurality of ball valves 170 on its upper surface 172 for the purpose of providing a cushion of pressurized air between upper surface 172 and the lower surface 174 of carriage 30. Ball valves 170 are shown in detail in FIG. 13 and will be seen to comprise a body 176 threadedly connected to air passages 178 and having a ball 180 captured on seat 182. Spring 184 continuously urges ball 180 against seat 182, thereby blocking the flow of air from passage 178. Passage 178 is connected to a suitable source of low pressure compressed air through a network of air passages (not shown) drilled in base 16. When carriage 30 is positioned over balls 180, it depresses them out of contact with seat 182 thereby permitting the pressurized air to flow around balls 180 and form a cushion of pressurized air into the space 186, which is formed by the raising of carriage 30 under the air pressure. Ball valve assembly 170 is described in the aforementioned U.S. Pat. No. 4,179,106.

A plurality of such ball valves 170 are provided along the upper surface 172 of base 16 for the full extent of the available traverse of carriage 30. When carriage 30 is not positioned over a ball valve 170, it closes off the flow of air at that point thereby conserving air pressure.

A pair of retaining rails 188 and 190 are rigidly connected to base 16 by screws 192 and extend the full traverse length of carriage 30. With air pressure shut off and carriage 30 resting on the upper surface 172 of base 16, there is a very small clearance between rails 188 and the side portions 194 of carriage 30. With the air pressure energized, the friction between carriage 30 and base 16 is reduced to almost zero and carriage 30 can be traversed along base 16 by DC motor 34 and ball screw drive 32, 36. A pair of air clamps 196 each comprising a cylinder 198 and a piston 200 slidably received therein are provided in the side portion 194 of carriage 30. Cylinders 198 are connected to a source of pressurized air or hydraulic fluid, and when pressurized, force pistons 200 against the side wall 202 of base 16 thereby locking carriage 30 against movement. If the opposite side wall 204 of base 16 is machined extremely flat, true and parallel to the desired traverse line of carriage 30, when carriage 30 is locked in place, it will be properly aligned with the center line of spindle 45. Even if the opposite surface 202 is not perfectly parallel to surface 204 nor is machined flat with a high degree of accuracy, carriage 30 will nevertheless be jammed against the primary way surface 204 and proper alignment is achieved. Of course, when carriage 30 is stopped, air pressure through valves 170 is normally interrupted.

Four similar air clamps 208 each comprising a cylinder 210 and a piston 212 slidable therein are provided in the side portions 194 of carriage 30, but are oriented vertically along axes orthogonally related to the axes of air clamps 196. When activated, pistons 212 bear against guide rails 190 and force carriage 30 downwardly so that the lower surface 174 thereof is pressed tightly against the upper surface 172 of base 16. If upper surfaces 172 are machined extremely flat, true and level, the action of air clamps 208 will ensure that carriage 30 is level with respect to the axis of rotation of spindle 45. The advantage of the air clamp arrangement and pressurized air support system for traversing and locking carriage 30 is that very little effort is required to move the carriage, yet when it is stopped and locked in place, proper positioning is achieved by forming only three primary way surfaces. The use of air clamps 196 and 208 is also relatively inexpensive when compared to other prior art mechanical systems for locking carriages.

Rotary index table 28 is supported on carriage 30, and its axis of rotation is maintained by hub member 214 and tapered roller bearings 216. Table 28 is supported by a hydrostatic bearing 218 comprising a squeeze film sill 220 having a plurality of hydrostatic pockets 222 connected to a suitable source of pressurized hydraulic fluid through passages 224, and an oil drain 226 connected to a sump through passages 228. The operation of hydrostatic bearing 218 is conventional, and serves to support table 28 on a film of pressurized oil so that it can be rotated more easily relative to carriage 30. For lighter index tables 28, pressurized air could be utilized instead of a hydrostatic bearing.

Table 28 is rotated by a worm gear 230 driven by DC motor 232 and engaging a large circular gear 234. Encoding of the angular position of table 28 is accomplished by a conventional rack and pinion readout 236 similar to readout 159 (FIG. 3), such as that manufactured by Elm Systems of Wauconda, Ill. Rack and pinion readout 236 is mounted on carriage 30 and its pinion is driven by a circular rack 238 connected to tab readout 240, which is mounted on guide rail 190, has its pinion in engagement with a linear rack 242 connected to carriage 30. Rack and pinion readouts 236 and 240, which monitor the rotation of table 28 and the traverse of carriage 30, respectively, may be connected to a visual readout, or to a microprocessor or other numerical control system used to automatically control DC motors 232 and 34. Feedback may also be provided between encoder 159 and motor 152 (FIG. 3).

As an alternative technique for properly locating carriage 30 relative to the axis of spindle 45, one or more locating pins 244 are mounted within base 16 and selectively engage tapered sockets 246 provided in the lower surface of carriage 30. FIG. 15 illustrates one such locating pin and socket arrangement, which arrangement is disclosed in the aforementioned patent 4,179,106. A plurality of tapered bushings 248 are provided in the lower surface 174 of carriage 30, and a tapered locating pin 252 is slidably received within an opening 254 in base 16. Pin 252 is connected to piston 255, which is received in cylinder 256 and urged to its upper position by spring 259. When fluid pressure, either air or hydraulic, is admitted to cylinder 256 through passage 258, pin 252 is retracted thereby freeing carriage 30 for translation. When fluid pressure is exhausted from cylinder 256 and carriage 30 is supported on a cushion of air, the tapered nose 260 of pin 252 will be driven upwardly by spring 259 into the tapered bushings 248 positioned over it thereby very accurately locating carriage 30. When the air cushion is then exhausted and air clamps 200 and 208 energized, carriage 30 is locked in place.

Table 28 is provided with a plurality of ball valves 262 identical to those shown in FIG. 13, and is also provided with one or more locating pins of the type shown in FIG. 15. When a workpiece connected to a workpiece fixture is positioned on table 28 and air pressure through passages 264 energized, the depression of the balls of valves 262 by the lower surface of the workpiece fixture will cause a cushion of pressurized air to be developed between the fixture and table 28 thereby permitting the fixture to be moved easily to the desired position on table 28. The fixture can be accurately located by locating pins identical to pins 244, which engage tapered sockets in the lower surface of the fixture, as described in detail in U.S. Pat. No. 4,179,106.

What has been described above is a workpiece positioning system comprising three layers of pressurized fluid, the first to support the carriage 30 for movement on base 16, the second to support the rotation of table 28 on carriage 30, and the third to enable a workpiece or fixture (not shown) to be positioned and located easily on the upper surface of table 28. Because table 28 and carriage 30 can be moved with little force by virtue of the cushion of pressurized fluid supporting them, light duty translation and rotating drives can be used. Although the use of pressurized air for the upper surface of table 28 and the support of carriage 30 is preferred, pressurized hydraulic fluid could be utilized in certain cases, such as if the weight of the workpiece or table is so great that an air system could not be used. Although not shown, a conventional rotating fluid union would be utilized to connect pressurized air to table 28.

Figure 9:
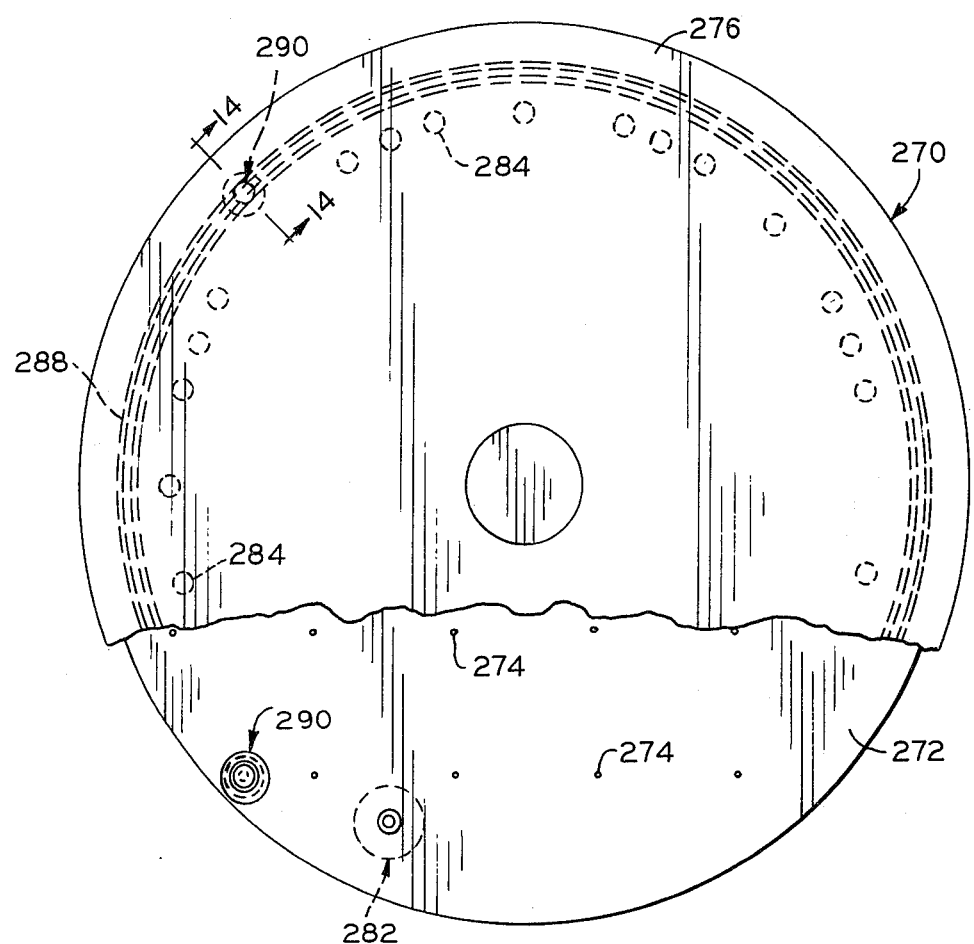
FIG. 9 is a plan view, partially in section, of an alternative rotary index table.
Figure 10:
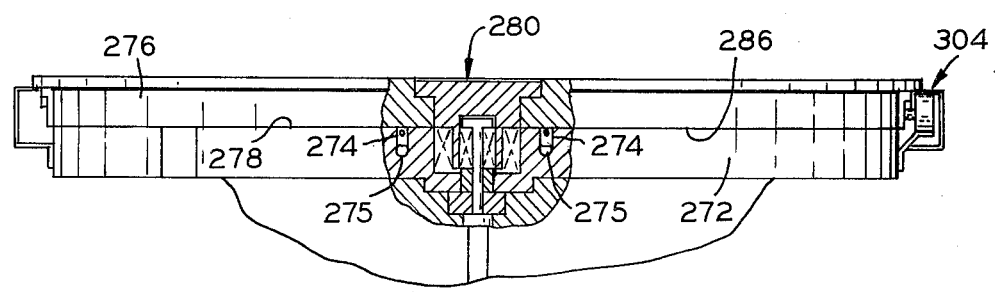
FIG. 10 is a side elevational view of the table of FIG. 9 with a portion thereof shown in section.

FIGS. 9 and 10 illustrate an alternative embodiment of the rotary index table, wherein locating pins of the type illustrated in FIG. 5 are utilized to accurately locate the angular position of the table. The table 270 in question comprises a base 272 supported on carriage 30 and is provided with a plurality of ball valves 274 of the type illustrated in FIG. 13, which are connected through passages 275 to a source of pressurized air. An upper table 276 is supported on the upper surface 278 of base 272 and its axis of rotation is defined by hub assembly 280. Locating pin 282 selectively engages one of the tapered sockets 284 in the lower surface 286 of table 276, and by positioning sockets 284 at the desired indexed positions, as in the case of bolt hole circle drilling, table 276 can be quickly and easily located. The cushion of pressurized air formed between table 276 and base 272 enables ease in rotation of table 276, and when the appropriate tapered socket 284 is positioned above locating pin 282 and locating pin 282 is energized, the tapered nose thereof will accomplish the fine adjustment so that when the air pressure is interrupted, table 276 will settle in a very accurately indexed position. Table 276 may also be provided with ball valves and a source of pressurized air.

The lower surface 286 of table 276 is provided with a circular T-slot 288, within which a T-clamp 290 is received. This arrangement is shown in more detail in FIG. 14. T-clamp assembly 290 comprises a T-shaped clamp element 292 having an enlarged head 294, which enters T-slot 288 through a suitably dimensioned opening (not shown) in table 276. Clamp element 292 is connected to a piston 296, which is slidably received in cylinder 298. When hydraulic or pneumatic pressure is introduced into cylinder 298 through passage 300, clamp element 292 is retracted and its head 294 draws table 276 downwardly against the upper surface 278 of base 272. When the hydraulic or pneumatic pressure is released, spring 302 raises clamp element 292 slightly, thereby releasing table 276 for further rotation. A conventional rack and pinion readout 304 mounted to base 272 can provide a visual indication of the angular position of table 276. The use of a T-clamp arrangement for clamping airfloat tables is described in the aforementioned application Ser. No. 040,072.

FIGS. 11 and 12 illustrate an arrangement whereby a carriage 306 can be maintained in a very accurate position as it is being traversed on base 308. As in the case of the embodiment of FIGS. 7 and 8, carriage 306 is traversed by a ball screw connection 310 driven by DC motor 312. A pair of retaining rails 314 and 316 provide the upper bearing surfaces 318 and 320, respectively, and very accurately machined ways 322 and 324 are located on base 308. A secondary way 323 is provided on one side of base 308 and a very accurately machined way 325 is provided on the opposite side. Antifriction bearings 326 of the type shown in FIG. 5 are connected to carriage 306 and bear against their respective ways. Preloading piston and cylinders 328 of the type shown in FIG. 4 are connected to the bearings 326 against the secondary ways, and serve to preload the bearing pairs so that the carriage 306 is jammed against the primary ways 322, 324 and 323 during movement. A bearing arrangement generally of this type is the subject of copending application 183,019 filed Sept. 2, 1980. As indicated earlier, the invention can also be used for supporting a spindle rotatable about a horizontal axis, and such a modification is shown in FIGS. 16, 17 and 18. The machine comprises a column structure similar to that described earlier and comprising a pair of columns 330 and 332, which are rigidly connected to a base (not shown) and to an upper plate 334. Column 330 includes an opening 336 to provide clearance for motor 338, which drives the horizontal spindle 340 illustrated in FIG. 16.

Column 330 has a front gib 342 and a rear gib 344 rigidly connected thereto, and column 323 similarly has a front gib 346 and a rear gib 348 rigidly connected thereto in a manner similar to that previously described. An antifriction bearing 350 is connected to the piston of preloading cylinder 352 and bears against gib 354. Antifriction bearing 356 is connected to the piston of preloading cylinder 358 and bears against gib 360. Antifriction bearing 362 is connected to the piston of preloading cylinder 364 and bears against the bearing surface of gib 344. Antifriction bearings 366 and 368 are rigidly connected to spindle housing 370 and bear against gibs 346 and 342, respectively. Antifriction bearing 372 is rigidly connected to housing 370 and bears against gib 374, all in essentially the same manner as described in connection with the earlier embodiment. Thus, spindle housing 370 is essentially the equivalent of arm 38 and can be raised and lowered by the same feed screw and motor assembly as shown in FIGS. 2 and 3. The preloaded bearing pairs provide for very accurate movement of housing 370 in the vertical direction.

FIG. 16 illustrates a conventional axially extendible spindle assembly 340 which is mounted for rotation and reciprocation within the front and rear walls 374 and 376, respectively, of housing 370. Spindle assembly comprises a spindle 378 slidably received within cylindrical housing 380 and supported for movement by bushings 382 and 384. Spindle 378 is keyed to housing 380 by keys 386 and 388 connected to housing 380 and received within keyways 390 and 392. Bearings 394 and 396 support housing 380 for rotation within the front and rear walls 374 and 376 of housing 370.

An electric or hydraulic motor 338 and transmission 398 are connected to housing 370. A bull gear 400 is rigidly connected to housing 380 (FIG. 16) and is driven by a second gear 402 connected to the output shaft of transmission 398. Transmission 398 is driven through a belt and pulley arrangement 404 shown in FIGS. 17 and 18. By this arrangement, spindle 390, which is adapted to engage a conventional tool, can be reciprocated in the horizontal direction by conventional means, such as a hydraulic cylinder and can be moved vertically by the same bearing and drive arrangement as utilized with the vertical embodiment described earlier.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus for machining parts comprising:
a base,
a bifurcated column structure rigidly connected to said base and extending generally upwardly therefrom, said column structure having spaced apart sides,
an arm captured between the spaced apart sides of said column structure and including a spindle and extending forwardly from said column structure, said arm including an upper end and a lower end each received between the spaced apart sides of the column structure, spindle means connected to said arm spindle end for selectively engaging and rotating a variety of tools, three vertical primary ways on said column structure, one of said primary ways being orthogonally related to the other two primary ways, three vertical secondary ways on said column structure in opposed relation respectively to said primary ways, one of said secondary ways being orthogonally related to the other two secondary ways, a plurality of first linear bearing means connected to and carried by said arm and being positioned respectively between said upper end and said ways and bearing against said ways for guiding said arm vertically on said ways, and a plurality of second linear bearing means connected to and carried by said arm and being positioned respectively between said arm lower end and said ways and bearing against said ways for guiding said arm on said ways, means connected to said arm for moving said arm vertically in said column structure, and fluid pressure preload means acting against each first and second linear bearing means connected between a secondary way and said arm for urging said arm in a direction normal to the respective opposite primary way to preload the bearing means bearing against the primary ways both during movement of said arm in said column structure and when said arm is at rest.

2. The apparatus of claim 1 wherein said ways are planar guide surfaces, opposing said primary and secondary ways are parallel, said one primary way is in a plane perpendicular to the planes of said other primary ways, and said one secondary way is in a plane perpendicular to the planes of said other two secondary says.

3. The apparatus of claim 1 wherein there are only three said primary and three said secondary ways in said column structure.

4. The apparatus of claim 1 wherein said column structure comprises two spaced apart columns, two of said primary ways and one of said secondary ways are on one column and the remaining ways are on the other column.

5. The apparatus of claim 1 wherein said arm is generally L-shaped and a portion thereof received in said column structure is longer vertically than the portion extending forwardly from said column structure.

6. The apparatus of claim 5 wherein said spindle means is oriented to rotate about a vertical axis substantially parallel to the direction of movement of said arm in said column structure.

7. The apparatus of claim 1 wherein said means for moving said arm comprises a screw connected to said arm and motor means for rotating said screw about its axis.

8. The apparatus of claim 1 including a work table base extending forwardly beyond said column structure and beyond said spindle means, whereby work to be machined can be supported on the table base beneath said spindle means.

9. The apparatus of claim 8 including a rotary indexing table rotatably connected to said base for rotation about a vertical axis.

10. The apparatus of claim 9 including carriage means on said table base for translating said table along an axis perpendicular to the direction of movement of said arm within said column structure.

11. The apparatus of claim 10 including means for accurately locking said table in a predetermined rotary position, and means for accurately locking said carriage at a predetermined distance from said column structure.

12. The apparatus of claim 11 wherein said means for locking said table and carriage comprises cooperating pins and sockets on said table and carriage and cooperating pins and sockets on said carriage and table base, and wherein said pins are retractable.

13. The apparatus of claim 11 wherein said means for locking said carriage comprises clamp means on one of said table base and carriage and acting against the other of said table base and carriage.

14. The apparatus of claim 13 wherein said clamp means comprises at least two clamps acting along respective axes which are orthogonally related to each other.

15. The apparatus of claim 11 wherein said means for locking said table comprises clamp means on one of said table and base table base and acting against the other of said table and table base.

16. The apparatus of claim 10 wherein said carriage is selectively supported on a cushion of pressurized fluid between said carriage and said table base, and said table is selectively supported on a cushion of pressurized fluid between said table and carriage.

17. The apparatus of claim 10 including motor driven gearing means for rotating said table.

18. The apparatus of claim 1 wherein said arm and spindle means together constitute a rigid structure such that said spindle means is incapable of moving relative to said arm in directions transverse to the axis of rotation thereof.

19. The apparatus of claim 1 wherein each said preload means comprises an expansible chamber device connected to said arm and the respective bearing means, and means for introducing pressurized fluid in said expansible chamber device to expand said expansible chamber device thereby pressing the bearing means connected thereto against the respective secondary way.

20. The apparatus of claim 19 wherein said expansible chamber device comprises a piston and cylinder.

21. The apparatus of claim 20 wherein said first preload means comprises six said piston and cylinders and said second preload comprises six said piston and cylinders.

22. The apparatus of claim 19 wherein said bearing means are antifriction bearing means having rollers.

23. The apparatus of claim 19 wherein said means for introducing pressurized fluid in said expansible chamber device comprises means for ensuring a substantially constant fluid pressure in said expansible chamber device whereby there is a constant preloading of the respective bearing means.

24. The apparatus of claim 23 wherein said means for ensuring a substantially constant pressure comprises a relief valve.

25. An apparatus for machining parts comprising:
a base,
a bifurcated column structure rigidly connected to said base and extending generally upwardly therefrom, said column structure having spaced apart sides,
a spindle housing captured between the spaced apart sides of said column structure, said spindle housing including an upper end and a lower end each received between the spaced apart sides of the column structure, spindle means connected to said housing and including means for selectively engaging and rotating a variety of tools, three vertical primary ways on said column structure, one of said primary ways being orthogonally related to the other two primary ways, three vertical secondary ways on said column structure in opposed relation respectively to said primary ways, one of said secondary ways being orthogonally related to the other two secondary ways, a plurality of first linear bearing means connected to and carried by said housing and being positioned respectively between said housing upper end and said ways for bearing against said ways and guiding said housing vertically on said ways, and a plurality of second linear bearing means connected to and carried by said housing and being positioned respectively between said housing lower end and said ways for bearing against said ways and guiding said housing on said ways, means connected to said housing for moving said housing vertically in said column structure, and fluid pressure preload means acting against each first and second linear bearing means connected between a secondary way and said housing for urging said housing in a direction normal to the respective opposite primary way to preload the bearing means acting against the primary ways during movement of said housing within said column structure.

* * * * *